United States Patent
Ikenaga et al.

(10) Patent No.: US 10,715,398 B2
(45) Date of Patent: Jul. 14, 2020

(54) CONTROLLING A USER TERMINAL TO PROVIDE CONTENT ITEMS SELECTED BY A USER

(71) Applicant: SONY CORPORATION, Tokyo (JP)

(72) Inventors: Kenichi Ikenaga, Tokyo (JP); Yukihiro Isono, Tokyo (JP); Tomoaki Takemura, Tokyo (JP); Koji Fujita, Tokyo (JP); Kenichiro Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 381 days.

(21) Appl. No.: 14/469,889

(22) Filed: Aug. 27, 2014

(65) Prior Publication Data

US 2015/0067522 A1 Mar. 5, 2015

(30) Foreign Application Priority Data

Sep. 3, 2013 (JP) ................. 2013-182481

(51) Int. Cl.
*H04L 12/24* (2006.01)
*H04L 12/28* (2006.01)
*H04L 12/12* (2006.01)

(52) U.S. Cl.
CPC .......... *H04L 41/22* (2013.01); *H04L 12/2812* (2013.01); *H04L 12/12* (2013.01); *H04L 2012/2849* (2013.01)

(58) Field of Classification Search
CPC ................. H04L 12/12; H04L 12/2812; H04L 2012/2849; H04L 41/22; H04L 12/2809;
(Continued)

(56) References Cited

U.S. PATENT DOCUMENTS

| 2010/0097648 A1* | 4/2010 | Mori | H04N 5/775 358/1.15 |
| 2012/0200400 A1* | 8/2012 | Arling | G08C 19/28 340/12.28 |

(Continued)

FOREIGN PATENT DOCUMENTS

| CN | 1736105 A | 2/2006 |
| CN | 101083742 A | 12/2007 |

OTHER PUBLICATIONS

MTI Photography, "Logitech Software Demo for Logitech Harmony Series Remote 1000 1100", (Mar. 1, 2011), <URL https://www.youtube.com/watch?v=ErXF5KqMHOs/>, p. 1-8.*

(Continued)

*Primary Examiner* — Ajay M Bhatia
*Assistant Examiner* — Mong-Shune Chung
(74) *Attorney, Agent, or Firm* — Chip Law Group

(57) ABSTRACT

Provided is a control apparatus including a control unit configured to control, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network.

7 Claims, 13 Drawing Sheets

(58) Field of Classification Search
CPC ......... H04L 12/2816; H04L 2012/2841; G06F 3/0482; G06F 3/0488; G06F 3/0481; G06F 17/30873; G08C 2201/92; G08C 2201/93; H04N 21/4126; H04N 2005/4425; H04N 21/42207; H04N 21/4222; H04N 21/4227; H04N 21/4622; H04N 21/485; H04N 5/4403; H04M 1/7253; H04M 1/72533; H04W 8/005
See application file for complete search history.

(56) References Cited

U.S. PATENT DOCUMENTS

2013/0007202 A1* 1/2013 Lee .................. G06F 1/1626
   709/217
2013/0152135 A1* 6/2013 Hong ............... H04N 21/4622
   725/51

OTHER PUBLICATIONS

A Ishukawa, "Logitech Software Demo for Logitech Harmony Series Remote 1000 1100", (Mar. 1, 2011), <URL https://www.youtube.com/watch?v=ErXF5KqMHOs/>, p. 1-11 (Year: 2011).*

James Bruce, "Logitech Harmony custom lighting control Tutorial", (May 25, 2013), <URL https://www.youtube.com/watch?v=dNs3JBuZXEM/>, p. 1-4 (Year: 2013).*

Logitech, "Logitech® Harmony® 700 Remote User Manual", 2010, p. 1-26 (Year: 2010).*

Startup Procedure of TV SideView, "http://www.sony.jp/support/tv/connect/tvsideview/", Sony Marketing (Japan) Inc., dated Sep. 3, 2013.

Office Action for CN Patent Application No. 201410432723.9, dated Jun. 29, 2018, 06 pages of Office Action and 11 pages of English Translation.

* cited by examiner

Content search

Applications

- 25 square puzzle
  BRAVIA JP 2013?
- Bananonkey
  BRAVIA JP 2013?
- Berliner Philharmoniker
  BLU-RAY HOME THEATRE SYSTEM
- Billabong
  BRAVIA JP 2013?
- Billabong
  BLU-RAY HOME THEATRE SYSTEM
- Facebook
  BRAVIA JP 2013?
- Music Player
  BLU-RAY HOME THEATRE SYSTEM

FIG.13

CONTROLLING A USER TERMINAL TO PROVIDE CONTENT ITEMS SELECTED BY A USER

CROSS REFERENCE TO RELATED APPLICATIONS

This application claims the benefit of Japanese Priority Patent Application JP 2013-182481 filed Sep. 3, 2013, the entire contents of which are incorporated herein by reference.

BACKGROUND

The present technology relates to a control apparatus, a control method, and a program. More specifically, the present technology relates to a control apparatus, a control method, and a program that enhance usability of, for example, a user terminal such as a smartphone and a tablet.

There has been provided, for example, a second screen application that uses a display apparatus such as a TV (television set) as a primary screen, and a user terminal such as a smartphone and a tablet as a secondary screen (second screen).

As an example of the second screen application, there is "TV SideView" provided by Sony Corporation (refer, for example, to "Using TV SideView" (online) (searched on Aug. 30, 2013) (URL: http://www.sony.jp/support/tv/connect/tvsideview/)). The "TV SideView" enables the user terminal to function as a remote commander for a TV and the like.

SUMMARY

In recent years, there have been demands to enhance usability of the user terminal as the second screen. There is a need to enhance usability of a user terminal.

According to an embodiment of the present technology, there is provided a control apparatus including a control unit configured to control, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network, or a program that causes a computer to function as such a control unit.

According to another embodiment of the present technology, there is provided a control method including controlling, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network.

In the embodiment of the present technology, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected are controlled as control targets via the network.

Note that examples of the control apparatus include an independent apparatus and an internal block of a single apparatus. Further, examples of how the program is provided include transmission via a transmission medium, and loading from a recording medium.

According to the embodiments of the present technology, higher usability is provided. Note that advantages of the embodiments of the present disclosure are not necessarily limited to this advantage, and may include any other advantages described in the present disclosure.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 13 shows a display example of the touch panel 64 at the time of the content output control process.

DETAILED DESCRIPTION OF EMBODIMENT

Hereinafter, an embodiment of the present disclosure will be described with reference to the drawings.

(Second Screen System According to Embodiment of Present Technology)

Figure 1:
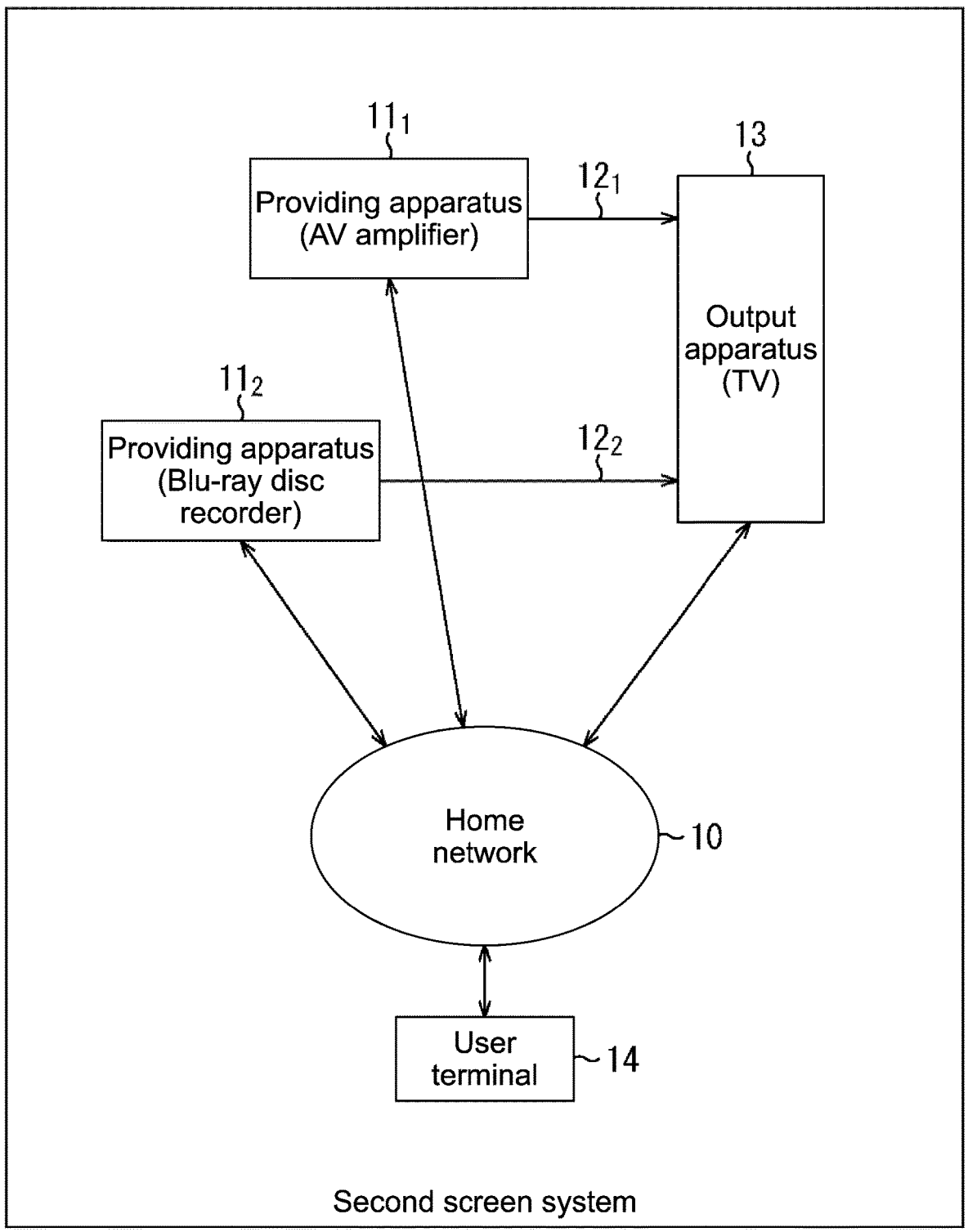
FIG. 1 shows a configuration example of a second screen system according to an embodiment of the present technology.

FIG. 1 shows a configuration example of a second screen system according to an embodiment of the present technology. The second screen system includes a home network 10, providing apparatus $11_1$ and $11_2$, an output apparatus 13, and a user terminal 14.

Examples of the home network 10 include a wired or wireless LAN (Local Area Network) and a wired and wireless LAN that are established in a house of a user who uses the user terminal 14. In FIG. 1, the providing apparatus $11_1$ and $11_2$, the output apparatus 13, and the user terminal 14 are connected to the home network 10.

Example of the providing apparatus $11_i$ (in FIG. 1, i=1, 2) include an apparatus capable of providing content to external apparatus. Specific examples of the providing apparatus $11_i$ include a media player configured to reproduce content. More specific examples of the providing apparatus $11_i$ include an AV (Audio Visual) amplifier and a Blu-ray disc recorder.

The providing apparatus $11_i$ is configured to be connected to the external apparatus via a cable $12_i$, and provides (supply) content via the cable $12_i$ to the external apparatus that is also connected to the cable $12_i$.

In FIG. 1, the providing apparatus $11_i$ is connected to the output apparatus 13 via the cable $12_i$. Thus, the content to be provided, for example, by reproduction by the providing apparatus $11_i$ is supplied to the output apparatus 13 via the cable $12_i$.

The output apparatus 13 is an apparatus configured to be capable of perceptively outputting the content supplied from the outside that is, outputting the content such that the content can be perceived by persons. Examples of the output apparatus 13 include a TV (television set) configured to display images of the content and output voice of the content.

The output apparatus 13 includes one or more input terminals configured to receive the content to be supplied from the outside (receiving signals of the content). When the cable $12_i$ is connected to the input terminal, connection between the output apparatus 13 and the providing apparatus $11_i$ can be established. The output apparatus 13 outputs (displays) the images and voice of the content to be supplied from the providing apparatus $11_i$ via the cable $12_i$.

Note that, unlike FIG. 1 in which the two providing apparatus $11_1$ and $11_2$ are connected to the home network 10, a single or three or more providing apparatus may be connected to the home network 10.

Further, unlike FIG. 1 in which the single output apparatus 13 is connected to the home network 10, two or more output apparatus may be connected to the home network 10.

In a case where the two or more output apparatus are connected to the home network 10, the providing apparatus $11_1$ and $11_2$ may be connected to the same one of the output apparatus, or may be connected to different ones of the output apparatus.

Examples of the user terminal 14 include a mobile apparatus such as a tablet and a smartphone. By run an application of a second screen, the providing apparatus $11_i$ and the output apparatus 13 connected to the network 10 are controlled via the network 10.

Note that the user terminal 14 is connected to the home network 10, for example, via a wireless LAN.

(Configuration Example of Providing Apparatus $11_i$)

Figure 2:
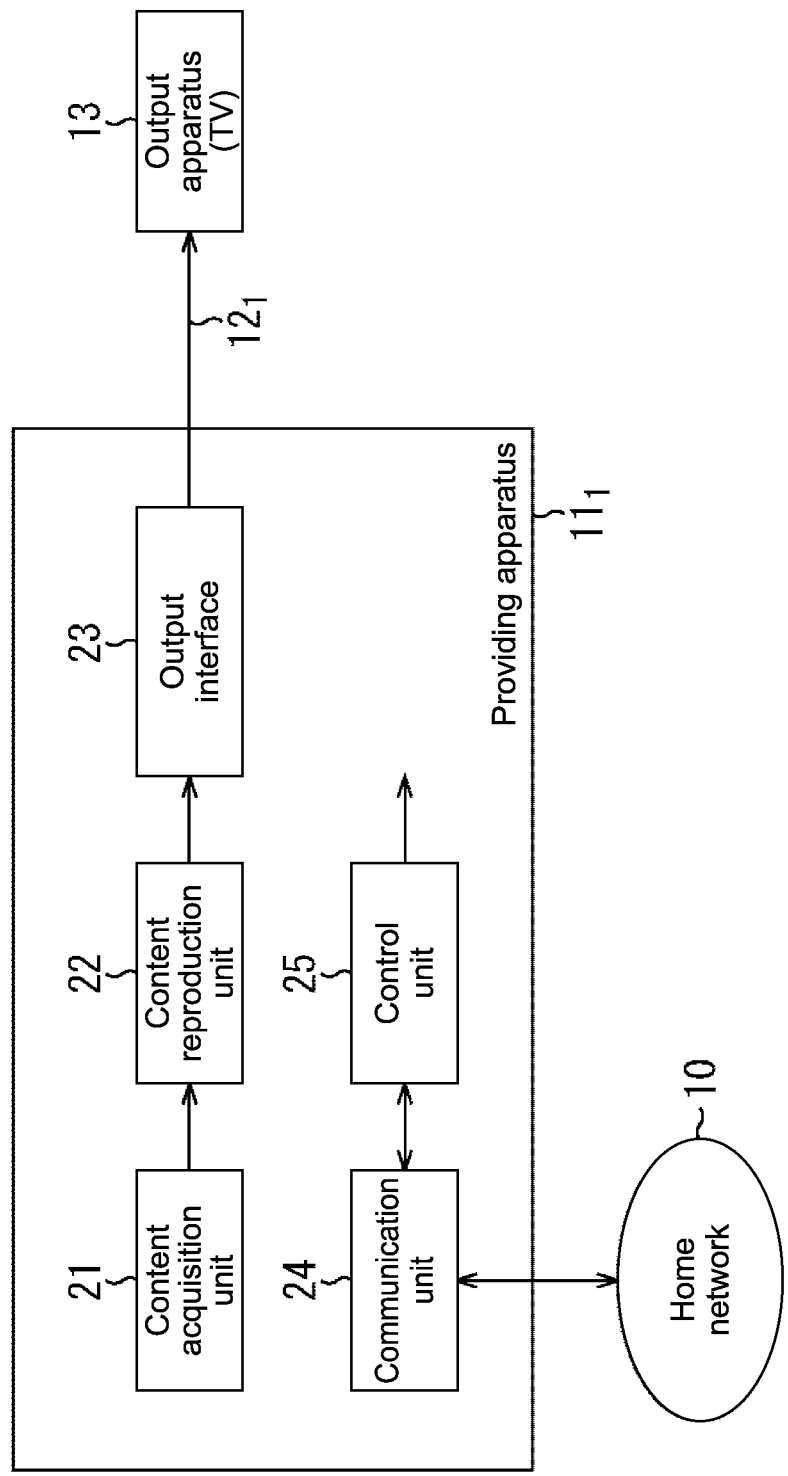
FIG. 2 is a block diagram showing a configuration example of a providing apparatus $11_1$.

FIG. 2 is a block diagram showing a configuration example of the providing apparatus $11_1$. The providing apparatus $11_i$ includes a content acquisition unit 21, a content reproduction unit 22, an output interface 23, a communication unit 24, and a control unit 25.

The content acquisition unit 21 is configured to acquire content that can be reproduced by the providing apparatus $11_i$, for example, from a storage medium or a server on the Internet (none of which is shown), and supply the content to the content reproduction unit 22.

The content reproduction unit 22 is configured to reproduce the content supplied from the content acquisition unit 21, and supply resultant AV data such as images and voice of the content to the output interface 23.

The output interface 23 is an interface configured to output the content to be supplied from the content reproduction unit 22 (output, for example, AV data such as images and voice of the content) to the output apparatus, and includes an output terminal (not shown) to which the cable $12_i$ can be connected.

In this embodiment, the cable $12_i$ that is connected to the output apparatus 13 is connected also to the output interface 23. The content to be output from the output interface 23 is supplied to the output apparatus 13 via the cable $12_i$.

The communication unit 24 is configured to function as a communication interface between the providing apparatus $11_i$ and the home network 10. The communication unit 24 is configured, under control of the control unit 25, to send data to the home network 10, receive data that is sent from the home network 10, and supply the data to the control unit 25.

The control unit 25 is configured to comprehensively control the providing apparatus $11_i$. Further, the control unit 25 is configured also to execute predetermined processes in response to, for example, the data sent from the home network 10 via the communication unit 24.

The providing apparatus $11_i$ configured as described above is controlled with the user terminal 14 via the home network 10, specifically, controlled in response to the data (such as a command and other information of other types) sent from the user terminal 14 via the home network 10. With this, reproduction of the content, provision of information of the content that can be provided (reproduced) by the providing apparatus $11_i$, and the like are performed.

More specifically, for example, the reproduction of the content is requested from the user terminal 14 via the home network 10, and the request of the reproduction is received by the communication unit 24 and supplied to the control unit 25. In this case, the control unit 25 controls the content acquisition unit 21, the content reproduction unit 22, and the output interface 23 so as to reproduce the content.

With this, the content acquisition unit 21 acquires the content whose reproduction is requested from the user terminal 14, and supplies the content to the content reproduction unit 22. The content reproduction unit 22 reproduces the content from the content acquisition unit 21, and the content reproduced by the content reproduction unit 22 is output from the output interface 23 so as to be supplied to the output apparatus 13 via the cable $12_i$.

Further, for example, a list of content items that can be provided is requested from the user terminal 14 via the home network 10, and the request is received by the communication unit 24 and supplied to the control unit 25. In this case, the control unit 25 generates the list of the content items that can be provided by the providing apparatus $11_i$ (list of content items that can be acquired by the content acquisition unit 21 and can be produced by the content reproduction unit 22). Then, the control unit 25 causes the communication unit 24 to send the list of the content items that can be provided by the providing apparatus $11_i$ to the user terminal 14 via the home network 10.

(Configuration Example of Output Apparatus 13)

Figure 3:
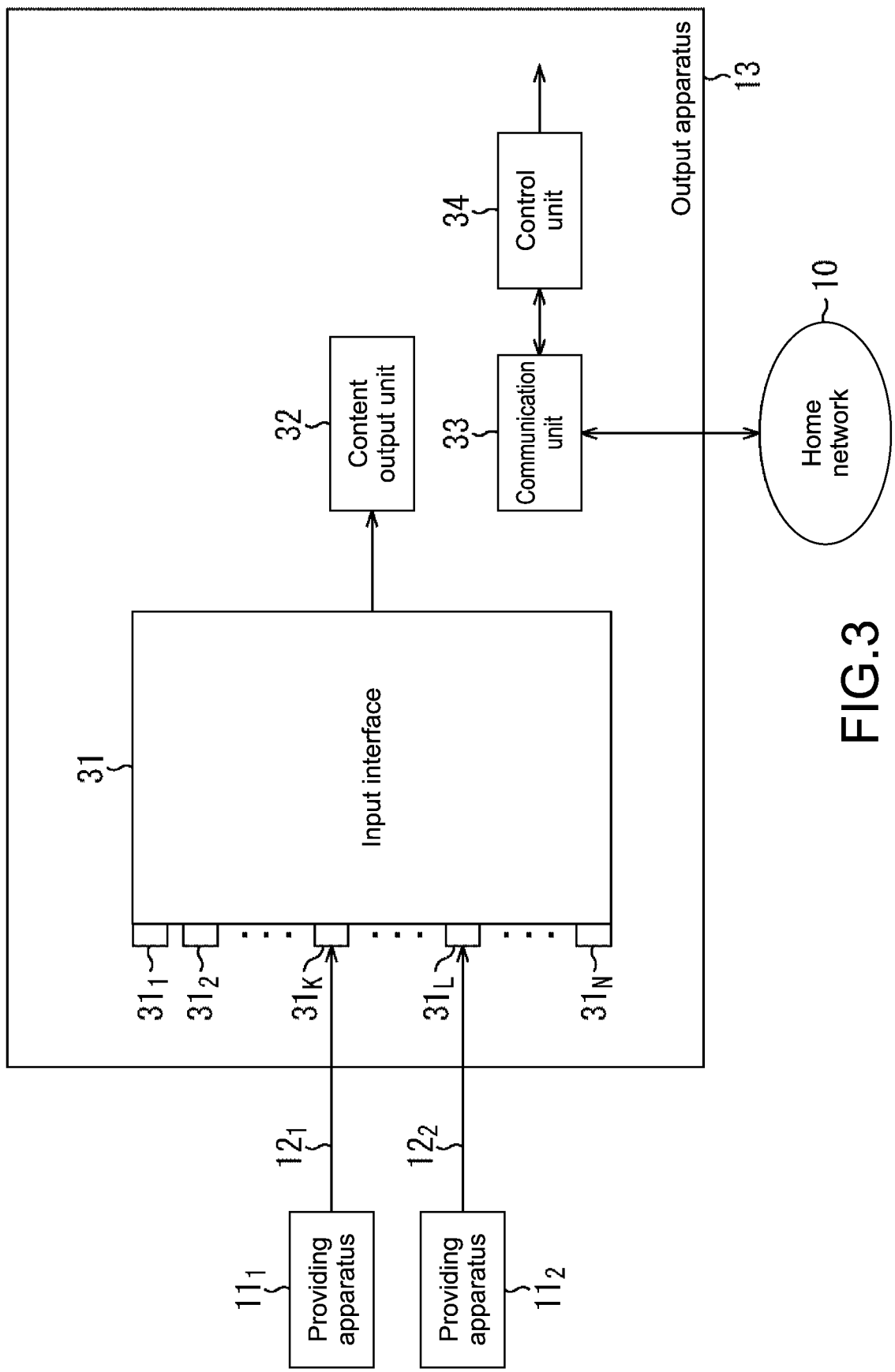
FIG. 3 is a block diagram showing a configuration example of an output apparatus 13.

FIG. 3 is a block diagram showing a configuration example of the output apparatus 13 of FIG. 1.

The output apparatus 13 includes an input interface 31, a content output unit 32, a communication unit 33, and a control unit 34.

The input interface 31 is an interface configured to input, to the output apparatus 13, the content to be supplied from the outside (AV data such as images and voice of the content), and includes "N," specifically, one or more input terminals $31_1$ to $31_N$ to which cables of various types can be connected.

Examples of the input terminal $31_n$ of the input interface 31 (in FIG. 3, n=1, 2, ... K, ... L, ... and N) and examples of the output terminal (not shown) of the output interface 23 of FIG. 2 include a terminal of an HDMI (trademark) (High-Definition Multimedia Interface), terminals for component signals, and a terminal for a composite signal.

Further, as the input terminal $31_n$ of the input interface 31, terminals of a predetermined type such as the HDMI (trademark) may be provided as many as the plurality of terminals. Specifically, the input interface 31 may be provided with a plurality of "M" input terminals $31_{n+1'}$, $31_{n+2'}$, ... and $31_{n+M'}$ of the same type such as the HDMI (trademark).

In FIG. 3, a cable $12_1$ is connected to a Kth input terminal $31_K$ of the input interface 31, and the providing apparatus $11_1$ is connected thereto via the cable $12_1$. Further, a cable $12_2$ is connected to an Lth input terminal $31_L$ of the input interface 31, and the providing apparatus $11_2$ is connected thereto via the cable $12_2$.

The input interface 31 is configured, under control of the control unit 34, to switch an input of the output apparatus 13, for example, to any of the "N" input terminals $31_1$ to $31_N$, and to supply content received via the switched input to the content output unit 32.

In other words, the input interface 31 is configured, under control of the control unit 34, to arbitrarily select the input terminal $31_n$ from among the "N" input terminals $31_1$ to $31_N$, and to supply the content to be input to the input terminal $31_n$ to the content output unit 32.

The content output unit 32 includes a display and a speaker (none of which is shown) configured to output images and voice of the content to be supplied from the input interface 31. Specifically, in the content output unit 32, the images of the content to be supplied from the input interface 31 are displayed on the display (not shown), and the voice of the content is output from the speaker (not shown).

The communication unit 33 is configured to function as a communication interface between the output apparatus 13 and the home network 10. The communication unit 33 is configured, under control of the control unit 34, to send data to the home network 10, receive data that is sent from the home network 10, and supply the data to the control unit 34.

The control unit 34 is configured to comprehensively control the output apparatus 13. Further, the control unit 34 is configured also to execute predetermined processes in response to, for example, the data sent from the home network 10 via the communication unit 33.

The output apparatus 13 configured as described above is controlled with the user terminal 14 via the home network 10, specifically, controlled in response to the data (such as a command and necessary information of other types) sent from the user terminal 14 via the home network 10. With this, switching of an input of the output apparatus 13 (selection of the input terminal $31_n$), control on a power source of the output apparatus 13, and the like are performed.

More specifically, for example, the switching of the input is requested from the user terminal 14 via the home network 10, and the request of the switching of the input is received by the communication unit 33 and supplied to the control unit 34. In this case, the control unit 34 controls the input interface 31 such that the input terminal $31_n$ requested by the request of the switching of the input is selected as an input terminal configured to supply content to the content output unit 32.

The input interface 31 selects the input terminal $31_n$ under the control of the control unit 34, and supplies the content to be input to the input terminal $31_n$ to the content output unit 32. With this, in the content output unit 32, for example, images of the content to be input to the input terminal $31_n$ are displayed.

Further, for example, a power-on request is issued from the user terminal 14 with a WoL (Wake on LAN) function via the home network 10, and the request is received by the communication unit 33 and supplied to the control unit 34. In this case, the control unit 34 turns on the output apparatus 13.

(Configuration Example of User Terminal 14)

Figure 4:
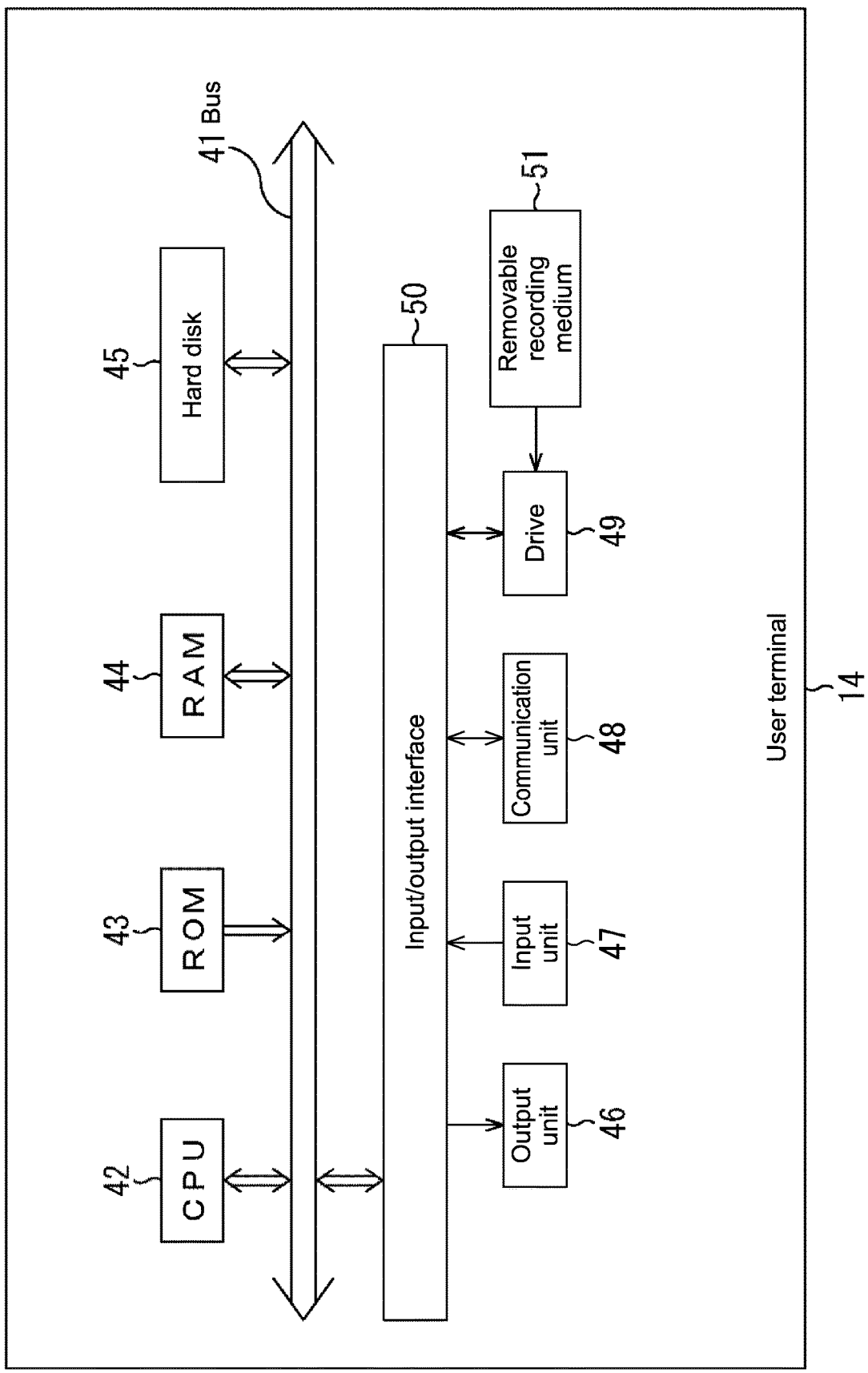
FIG. 4 is a block diagram showing a hardware configuration example of a user terminal 14.

FIG. 4 is a block diagram showing a hardware configuration example of the user terminal 14 of FIG. 1. In FIG. 4, the user terminal 14 includes a bus 41, a CPU (Central Processing Unit) 42, a ROM (Read Only Memory) 43, a RAM (Random Access Memory) 44, a hard disk 45, an output unit 46, an input unit 47, a communication unit 48, a drive 49, and an input/output interface 50.

The CPU 42, the ROM 43, the RAM 44, the hard disk 45, and the input/output interface 50 are connected to the bus 41. The CPU 42 is configured to execute programs stored in the ROM 43 in response to commands that are input, for example, through operations to the input unit 47 by the user of the user terminal 14 via the input/output interface 50. Alternatively, the CPU 42 may be configured to load programs stored in the hard disk 45 to the RAM 44 and execute the programs.

With this, the CPU 42 causes, for example, the user terminal 14 to function as a second screen.

The ROM 43 is configured to store the programs to be executed by the CPU 42, such as an IPL (Initial Program Loader). The RAM 44 stores the programs to be executed by the CPU 42, and data required for operation of the CPU 42. The hard disk 45 is configured to store second screen application programs for causing the user terminal 14 to function as the second screen, and required data.

The output unit 46 includes an LCD (Liquid Crystal Display) and a speaker. The output unit 46 is configured to display images and output voice. The input unit 47 includes a keyboard, a mouse, a touch pad, and a microphone. The input unit 47 is configured to be operated by the user.

The communication unit 48 is configured to control communication with the home network 10. Further, the communication unit 48 is configured also to control communication via a wireless network such as a 3G network and a LTE (Long Term Evolution).

The drive 49 is configured to removably mount a removable recording medium 51. The drive 49 is configured also to drive the removable recording medium 51 mounted thereto. Examples of the removable recording medium 51 include a flexible disc, a CD-ROM (Compact Disc Read Only Memory), a MO (Magneto Optical) disc, a DVD (Digital Versatile Disc), a magnetic disc, and a semiconductor memory.

The input/output interface 50 is configured to function as an interface between the bus 41 and input/output devices such as the output unit 46, the input unit 47, the communication unit 48, and the drive 49.

Note that the second screen application programs may be pre-installed, for example, in the hard disk 45. Alternatively, the second screen application programs may be installed, for example, from the removable recording medium 51 to the hard disk 45. Further, second screen client programs may be downloaded, for example, from a server on the Internet (not shown) via the home network 10, and installed to the hard disk 45. Further, a touch panel obtained by combining a display unit of the output unit 46, such as an LCD, and the touch pad of the input unit 47 integrally with each other serves as the user terminal 14.

Figure 5:
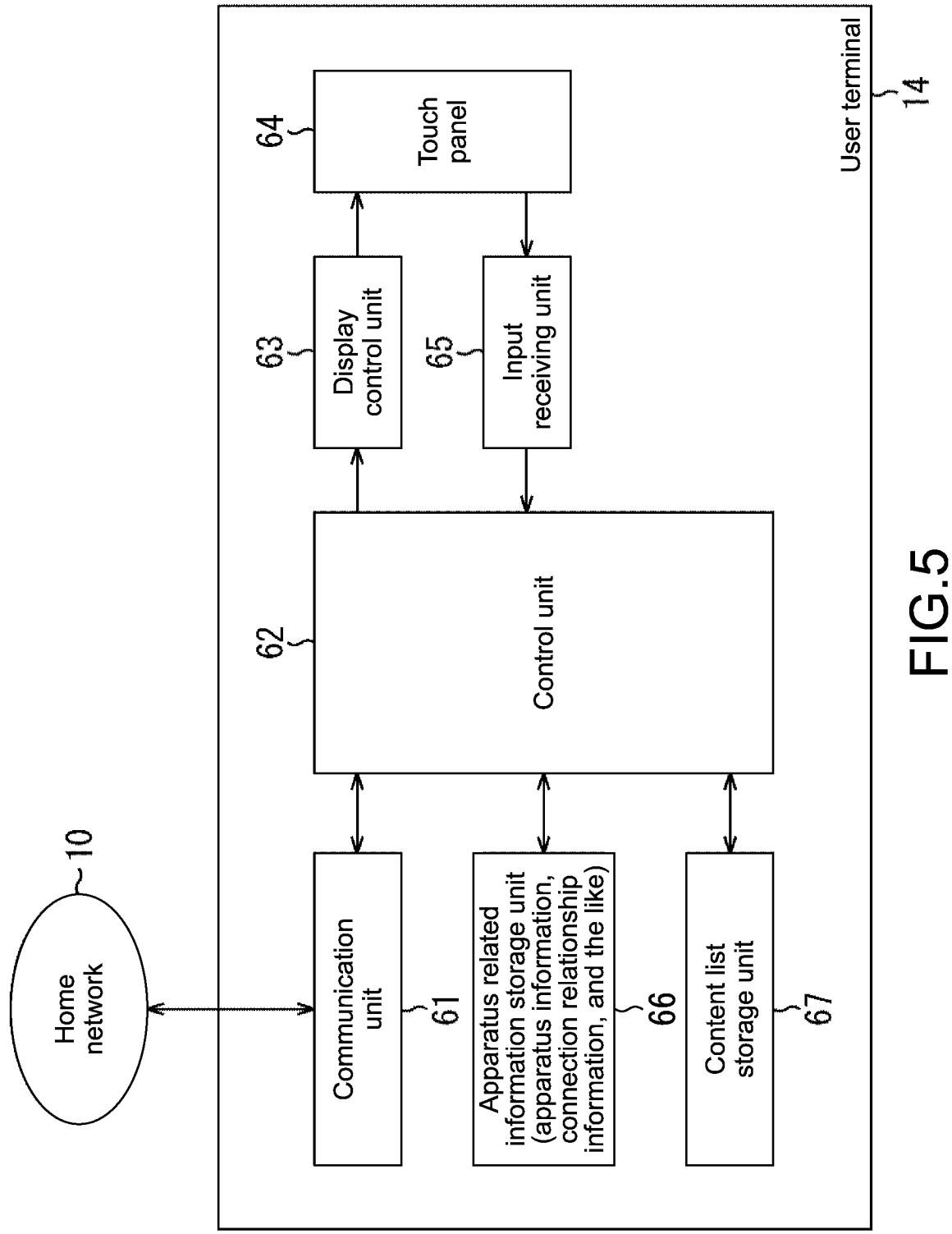
FIG. 5 is a block diagram showing a functional configuration example of the user terminal 14.

FIG. 5 is a block diagram showing a functional configuration example of the user terminal 14 of FIG. 1. The functional configuration example of FIG. 5 is (virtually) obtained by causing the CPU 42 (FIG. 4) of the user terminal 14 to execute the second screen application programs.

In FIG. 5, the user terminal 14 includes a communication unit 61, a control unit 62, a display control unit 63, a touch panel 64, an input receiving unit 65, an apparatus related information storage unit 66, and a content list storage unit 67.

The communication unit 61 is configured to function as a communication interface between the user terminal 14 and the home network 10. The communication unit 61 is configured, under control of the control unit 62, to send data to the home network 10, receive data that is sent from the home network 10, and supply the data to the control unit 62.

The control unit 62 is configured to comprehensively control the user terminal 14. Further, the control unit 62 is configured also to execute predetermined processes in response to, for example, the data sent from the home network 10 and supplied thereto via the communication unit 61. Still further, the control unit 62 is configured also to control the providing apparatus $11_i$ and the output apparatus 13 via the home network 10 by sending, for example, commands via the communication unit 61 to the providing apparatus $11_i$ and the output apparatus 13 that are connected to the home network 10.

Specifically, for example, from the providing apparatus $11_i$ and the output apparatus 13 that are connected to the home network 10, the control unit 62 collects apparatus information of the providing apparatus $11_i$ and the output apparatus 13 (information items of functions, specifications, and the like) via the home network 10 and the communication unit 61, and supplies the information to the apparatus related information storage unit 66.

Further, for example, according to an operation of the user terminal 14 by the user, the control unit 62 generates connection relationship information indicating a connection relationship between the providing apparatus $11_i$ and the output apparatus 13 that are connected to the home network 10, and supplies the connection relationship information to the apparatus related information storage unit 66.

Still further, for example, from the providing apparatus $11_i$ that are connected to the home network 10, the control unit 62 collects, via the home network 10 and the communication unit 61, lists of content items that can be provided by the providing apparatus $11_i$. The control unit 62 generates a content list obtained by integrating the lists of the content items that can be provided by the providing apparatus $11_i$ that are connected to the home network 10, and stores the integrated content list in the content list storage unit 67.

Yet further, for example, the control unit 62 supplies the content list stored in the content list storage unit 67 to the display control unit 63 such that the content list is displayed on the touch panel 64. Yet further, for example, in response to operation signals corresponding to the operation by the user, which are supplied from the input receiving unit 65, and based on apparatus related information such as the apparatus information and the connection relationship information that are stored in the apparatus related information storage unit 66, and on the content list that is stored in the content list storage unit 67, the control unit 62 controls, via the communication unit 61, the providing apparatus $11_i$ and the output apparatus 13 that are connected to the home network 10.

The display control unit 63 is configured, under control of the control unit 62, to perform display control to display images on the touch panel 64. The touch panel 64 is configured, under control of the display control unit 63, to display the images. The input receiving unit 65 is configured to receive (detect) an operation such as a touch to the touch panel 64 by the user, and supply an operation signal corresponding to the operation by the user to the control unit 62.

The apparatus related information storage unit 66 is configured to store the apparatus related information such as the apparatus information and the connection relationship information that are supplied from the control unit 62. The content list storage unit 67 is configured to store the content list to be supplied from the control unit 62.

The user terminal 14 configured as described above executes an apparatus setting process of executing settings necessary for controlling the providing apparatus $11_i$ and the output apparatus 13 via the home network 10, a content output control process of controlling output of content in the output apparatus 13, and other processes.

(Apparatus Setting Process)

Figure 6:
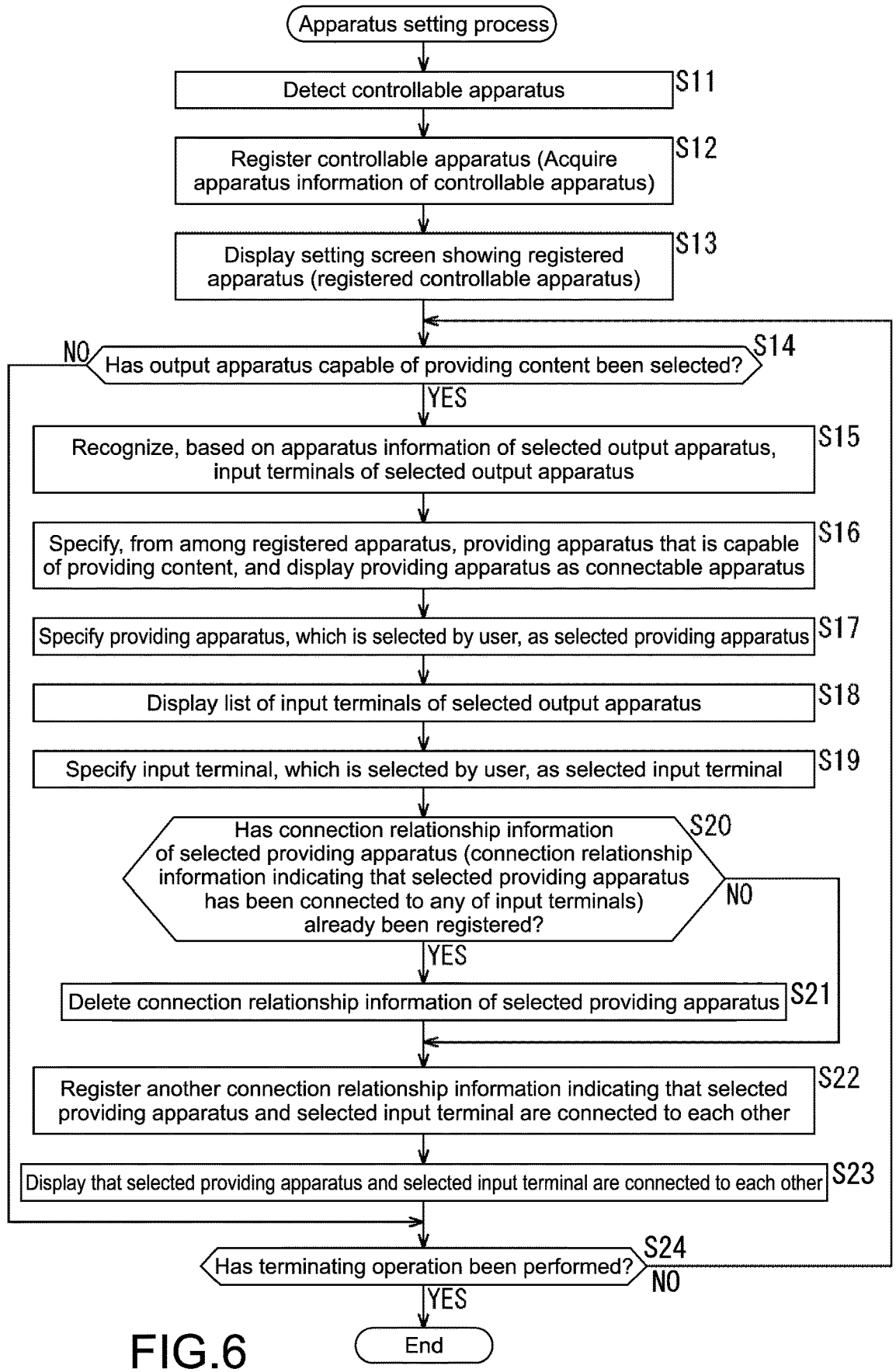
FIG. 6 is a flowchart showing an apparatus setting process to be executed in the user terminal 14.

FIG. 6 is a flowchart showing the apparatus setting process to be executed in the user terminal 14 of FIG. 5.

When the user operates the touch panel 64 (FIG. 4) of the user terminal 14 so as to execute the apparatus setting process, the operation signal corresponding to the operation by the user is supplied from the input receiving unit 65 to the control unit 62. Then, in Step S11, from among the apparatus on the home network 10, the control unit 62 detects a controllable apparatus that can be controlled from the user terminal 14 via the home network 10. Next, the flow proceeds to Step S12.

Note that the providing apparatus $11_i$ and the output apparatus 13 each correspond to the controllable apparatus. In Step S12, the control unit 62 registers the controllable apparatus with the user terminal 14, and the flow proceeds to Step S13.

Specifically, at the time of the registration of the controllable apparatus with the user terminal 14, the control unit 62 acquires apparatus information from the providing apparatus $11_i$ and the output apparatus 13 as the controllable apparatus via the home network 10, and stores the apparatus information in the apparatus related information storage unit 66.

The apparatus information of the controllable apparatus contains, as appropriate, information items for identifying the controllable apparatus, and information items of functions, specifications, and the like. Further, in order to perform control of turning on the controllable apparatus from the user terminal 14 with the WoL function via the home network 10, the control unit 62 acquires, as part of the apparatus information, a MAC (Media Access Control) address of the controllable apparatus to be turned on with the WoL function.

Note that the controllable apparatus registered with the user terminal 14 is also referred to as a registered apparatus. In this embodiment, the providing apparatus $11_i$ and the output apparatus 13 each correspond to the registered apparatus.

In Step S13, based on the apparatus information stored in the apparatus related information storage unit 66, the control unit 62 causes, via the display control unit 63, the touch panel 64 to display a setting screen showing the registered apparatus as the controllable apparatus that are registered with the user terminal 14. Then, the flow proceeds to Step S14. In this case, in this embodiment, images such as icons of the providing apparatus $11_1$ and $11_2$ as the registered apparatus and the output apparatus 13 are displayed on the setting screen.

In Step S14, the control unit 62 determines whether or not an output apparatus capable of outputting content has been selected by the user from the setting screen displayed on the touch panel 64.

In Step S14, when the control unit 62 determines that the output apparatus has not yet been selected from the setting screen displayed on the touch panel 64, the flow skips Steps S15 to S23 to proceed to Step S24.

Further, in Step S14, when the control unit 62 determines that the output apparatus has been selected from the setting screen displayed on the touch panel 64, specifically, for example, when the user operates the touch panel 64 so as to select the output apparatus 13 on the setting screen (to select an icon thereof), and an operation signal corresponding to the operation by the user is supplied from the input receiving unit 65 to the control unit 62, the flow proceeds to Step S15. Then, based on apparatus information of the selected output apparatus, specifically, of the output apparatus selected from the setting screen, the control unit 62 recognizes input terminals of the selected output apparatus. Next, the flow proceeds to Step S16.

Specifically, the apparatus information of the output apparatus contains information items of the input terminals of the output apparatus. In Step S15, based on the apparatus information stored in the apparatus related information storage unit 66, specifically, on the apparatus information of the output apparatus 13 as the selected output apparatus, the control unit 62 recognizes the input terminals $31_1$ to $31_N$ (FIG. 3) of the output apparatus 13.

In Step S16, the control unit 62 waits until an operation of issuing an instruction to add a connection apparatus to the output apparatus 13 as the selected output apparatus is input to the touch panel 64. Then, based on the apparatus information stored in the apparatus related information storage unit 66, the control unit 62 specifies, from among the registered apparatus, a providing apparatus capable of providing content as a connectable apparatus, and causes the touch panel 64 to display the connectable apparatus (via the display control unit 63).

In this embodiment, the providing apparatus $11_1$ and $11_2$ (images such as icons of the same) are displayed as connectable apparatus. After that, the flow proceeds from Step S16 to Step S17, and the control unit 62 waits until the user selects any of the providing apparatus that are displayed as the connectable apparatus on the touch panel 64, and specifies the providing apparatus, which is selected by the user, as a selected providing apparatus. Then, the flow proceeds to Step S18.

In Step S18, the control unit 62 causes the touch panel 64 to display a list of the input terminals $31_1$ to $31_N$ of the output apparatus 13 that is recognized as the selected output apparatus in Step S15. Then, the flow proceeds to Step S19.

In Step S19, the control unit 62 waits until the user selects, from the list of the input terminals $31_1$ to $31_N$, which is displayed on the touch panel 64, the input terminal $31_n$ to which the selected providing apparatus specified in Step S17 is connected, and specifies the input terminal $31_n$, which is selected by the user, as a selected input terminal. Then, the flow proceeds to Step S20.

In a case where the providing apparatus $11_1$ is specified as the selected providing apparatus, the providing apparatus $11_1$ is connected to the input terminal $31_K$ (FIG. 3). Thus, in Step S19, the user selects the input terminal $31_K$, and the control unit 62 specifies the input terminal $31_K$, which is selected by the user, as the selected input terminal.

Further, in a case where the providing apparatus $11_2$ is specified as the selected providing apparatus, the providing apparatus $11_2$ is connected to the input terminal $31_L$ (FIG. 3). Thus, in Step S19, the user selects the input terminal $31_L$, and the control unit 62 specifies the input terminal $31_L$, which is selected by the user, as the selected input terminal.

In Step S20, the control unit 62 determines whether or not connection relationship information of the selected providing apparatus, specifically, connection relationship information indicating that the selected providing apparatus has been connected to any of the input terminals has already been registered with the apparatus related information storage unit 66.

In Step S20, when the control unit 62 determines that the connection relationship information of the selected providing apparatus has already been registered with the apparatus related information storage unit 66, in other words, the connection relationship information of the selected providing apparatus has been stored in the apparatus related information storage unit 66, the flow proceed to Step S21. Then, the control unit 62 deletes the connection relationship information of the selected providing apparatus from the apparatus related information storage unit 66. Next, the flow proceeds to Step S22.

In Step S22, the control unit 62 generates another connection relationship information indicating that the selected providing apparatus and the selected input terminal are connected to each other, and registers (stores) this information with (in) the apparatus related information storage unit 66. Then, the flow proceeds to Step S23.

As described above, in a case where the connection relationship information of the selected providing apparatus has already been registered, this connection relationship information is overwritten with the other connection relationship information indicating that the selected providing apparatus and the selected input terminal are connected to each other. In this way, the other connection relationship information is registered.

Meanwhile, in Step S20, when the control unit 62 determines that the connection relationship information of the selected providing apparatus has not yet been registered with the apparatus related information storage unit 66, the flow skips Step S21 to proceed to Step S22. Then, as described above, the control unit 62 registers, with the apparatus related information storage unit 66, the other connection relationship information indicating that the selected providing apparatus and the selected input terminal are connected to each other. Next, the flow proceeds to Step S23.

In Step S23, the control unit 62 causes the touch panel 64 to display that the selected providing apparatus and the selected input terminal are connected to each other. Then, the flow proceeds to Step S24.

In Step S24, the control unit 62 determines whether or not an operation of terminating the apparatus setting process has been input to the touch panel 64. In Step S24, when the control unit 62 determines that the terminating operation has not yet been performed, the flow returns to Step S14, and the same processes are repeated. Further, in Step S24, when the control unit 62 determines that the terminating operation has been performed, the apparatus setting process is terminated.

(Display Examples of Touch Panel 64 During Apparatus Setting Process)

FIGS. 7 to 11 show display examples of the touch panel 64 during the apparatus setting process.

Figure 7:
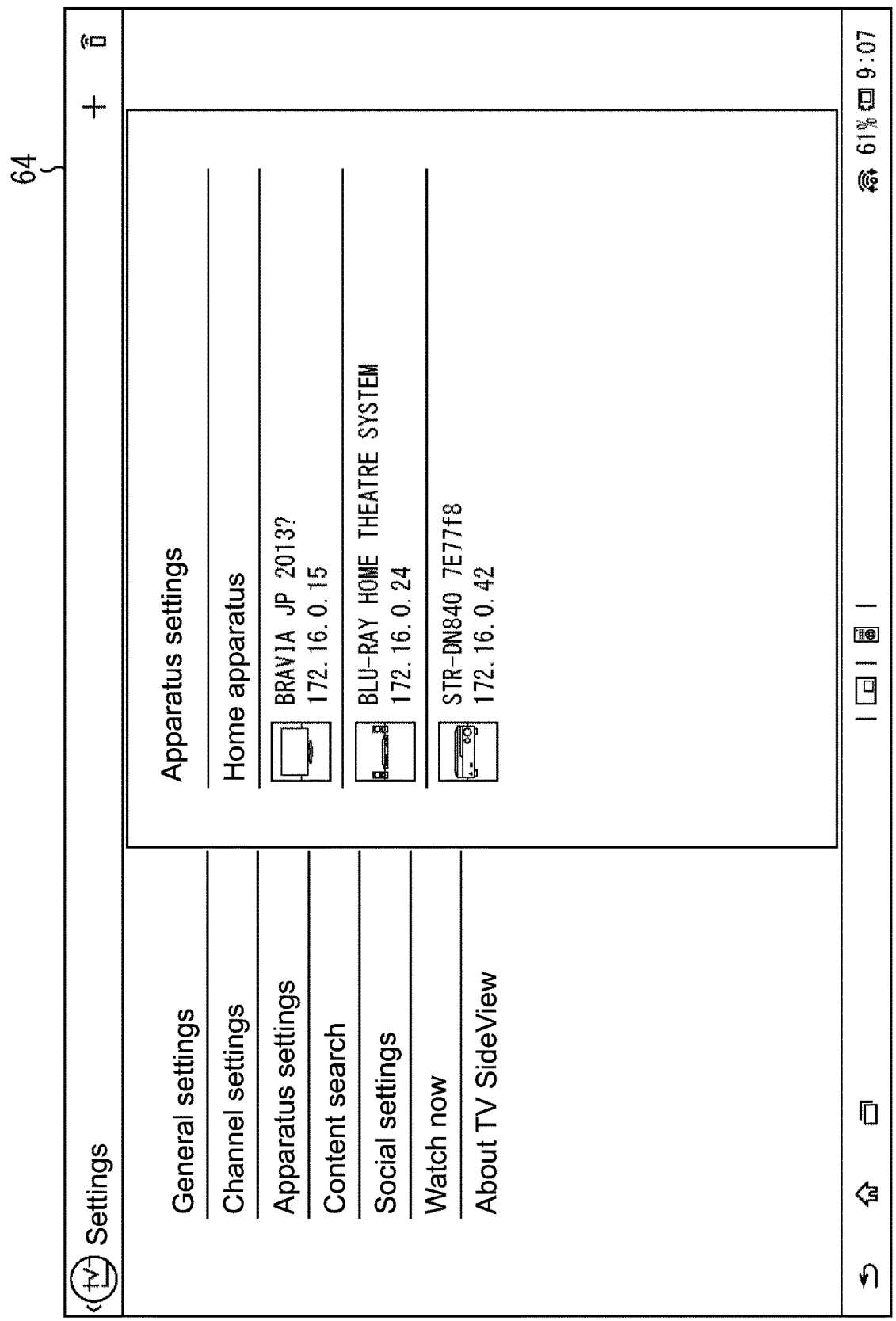
FIG. 7 shows a display example of a setting screen.

Specifically, FIG. 7 shows a display example of the setting screen displayed in Step S13 of FIG. 6.

As shown in FIG. 7, the setting screen shows both icons of registered apparatus and names of the registered apparatus.

In FIG. 7, an icon of a registered apparatus having a name of "BRAVIA JP 2013?" (hereinafter, also referred to as registered apparatus "BRAVIA JP 2013?" or the like), an icon of a registered apparatus "BLU-RAY HOME THEATRE SYSTEM," and an icon of a registered apparatus "STR-DN840 7E77f8" are displayed.

In this case, the registered apparatus "BRAVIA JP 2013?" is, for example, a TV as an output apparatus, and the registered apparatus "BLU-RAY HOME THEATRE SYSTEM" is, for example, a disc recorder as a providing apparatus. Further, the registered apparatus "STR-DN840 7E77f8" is, for example, an AV amplifier as a providing apparatus.

Figure 8:
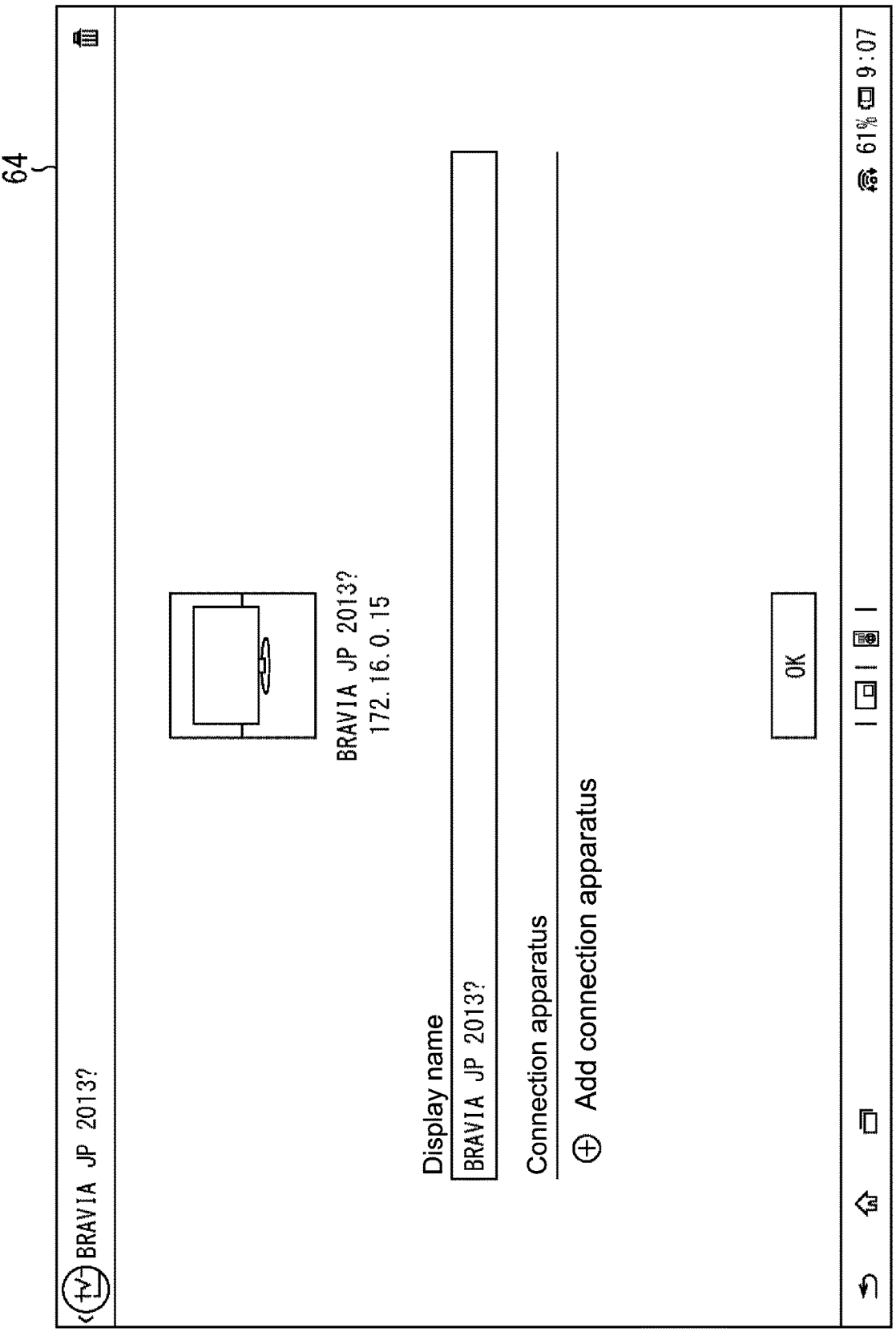
FIG. 8 shows a display example of a touch panel 64 at a time when a user selects an output apparatus from the setting screen.

FIG. 8 shows a display example of the touch panel 64 at a time when the user selects the output apparatus from the setting screen in Step S14 of FIG. 6. For example, from the setting screen of FIG. 7, when the user selects the registered apparatus "BRAVIA JP 2013?" that is a TV as the output apparatus (selects the icon of the same), as shown in FIG. 8, a detail screen showing details of the registered apparatus "BRAVIA JP 2013?" that is specified as a selected output apparatus is displayed on the touch panel 64.

The detail screen of FIG. 8 shows not only the icon, the name (display name), or the like of the registered apparatus "BRAVIA JP 2013?" as a selected output apparatus, but also a button "Add connection apparatus" for issuing an instruction to add a connection apparatus to be connected to the selected output apparatus.

In the detail screen of FIG. 8, when the user operates (taps) the button "Add connection apparatus," as described with reference to Step S16 of FIG. 16, a connectable apparatus list screen of connectable apparatus capable of providing content, which are selected from among the registered apparatus (displays list of images such as icons of the same), is displayed on the touch panel 64.

Figure 9:
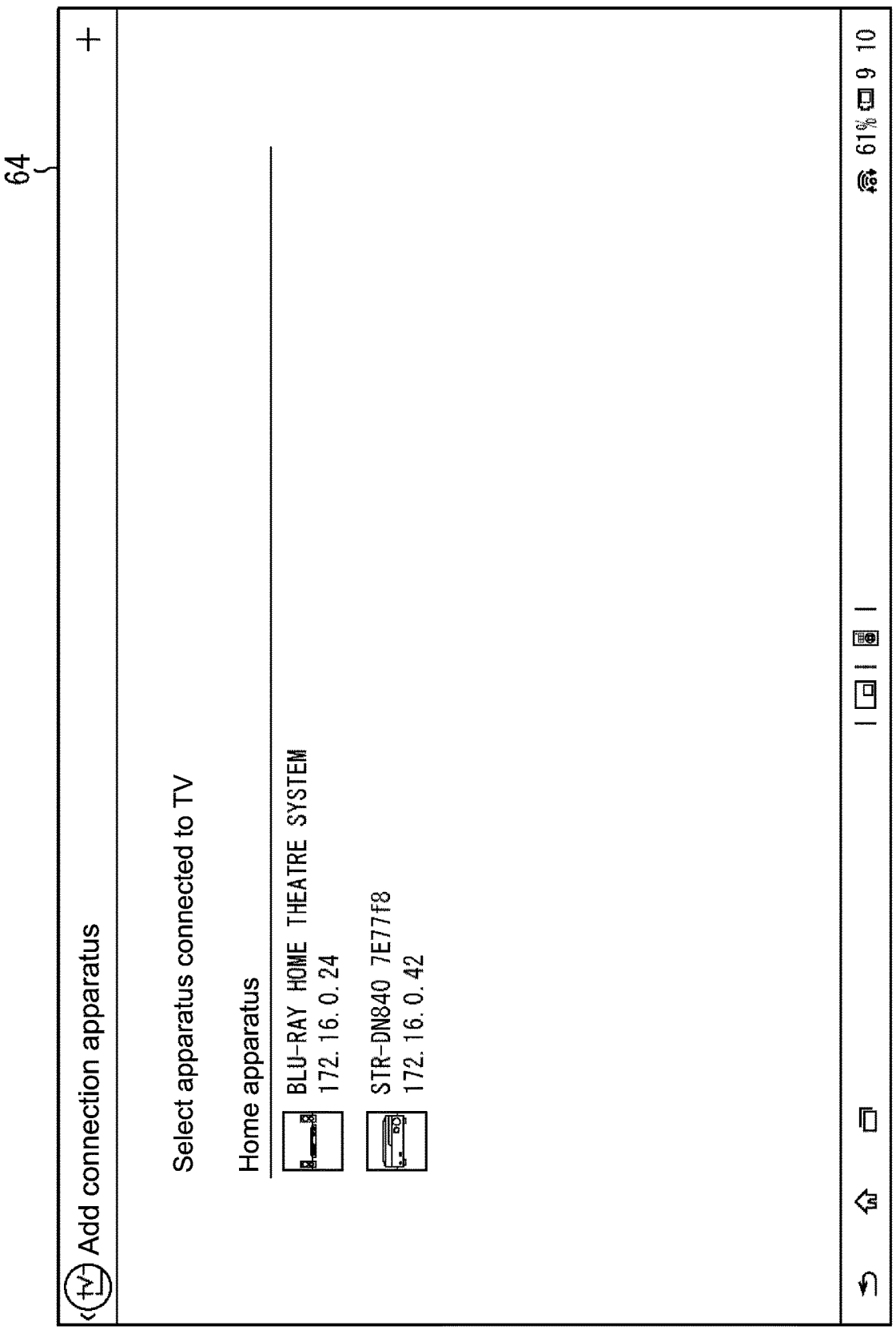
FIG. 9 shows a display example of a connectable apparatus list screen.

FIG. 9 shows a display example of the connectable apparatus list screen.

The connectable apparatus list screen of FIG. 9 shows the registered apparatus "BLU-RAY HOME THEATRE SYSTEM" and the registered apparatus "STR-DN840 7E77f8" as connectable apparatus (shows icons of the same). When the user performs an operation of selecting (taps) any of the connectable apparatus in the connectable apparatus list screen (FIG. 9), as described with reference to Step S17 of FIG. 6, a connectable apparatus selected by the user is specified as a selected providing apparatus.

Further, as describe with reference to Step S18 of FIG. 6, an input terminal list screen showing the list of the input terminals of the registered apparatus "BRAVIA JP 2013?" that is selected from the setting screen (FIG. 7) and displayed as the selected output apparatus on the detail screen (FIG. 8) is displayed on the touch panel 64.

Figure 10:
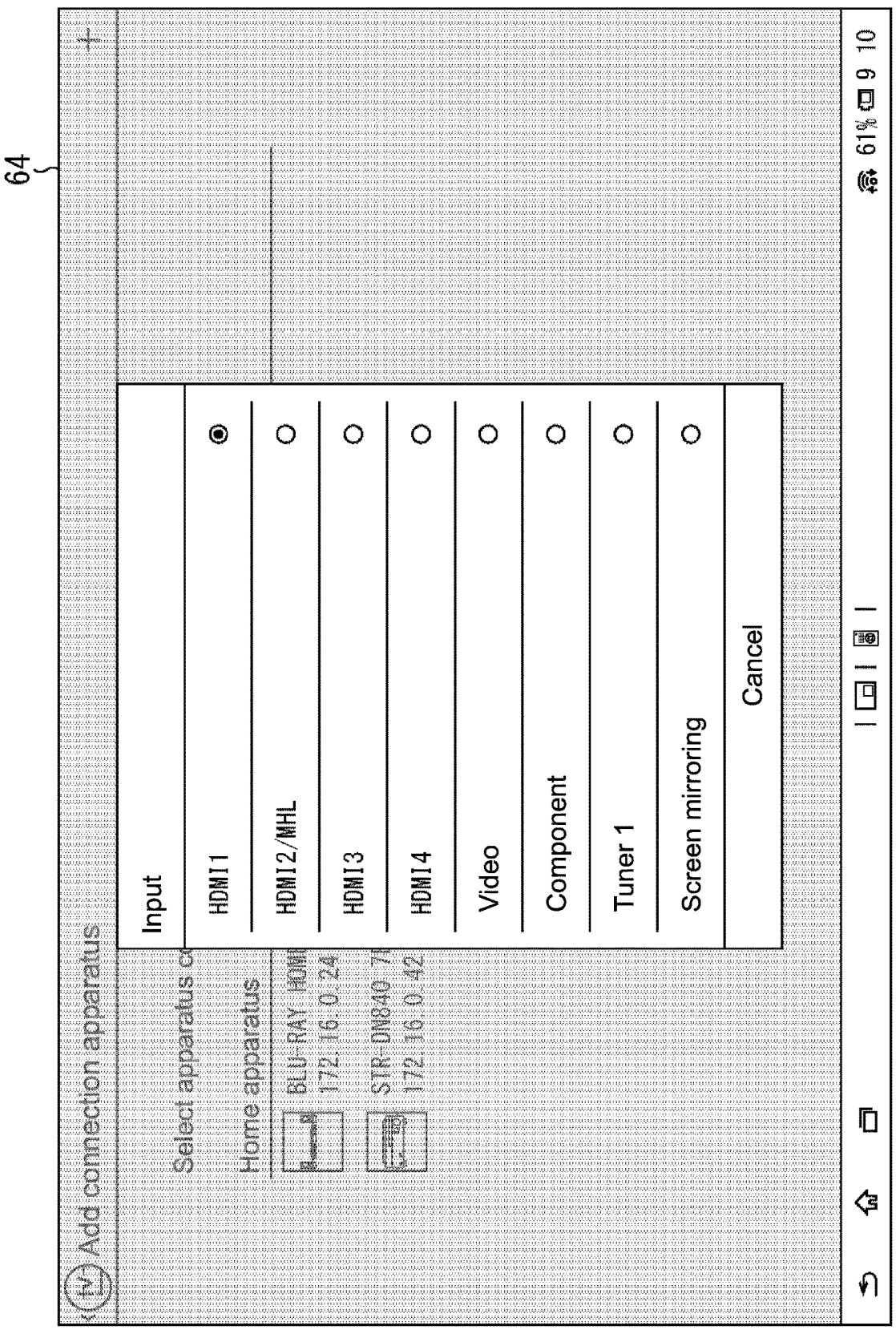
FIG. 10 shows a display example of an input terminal list screen.

FIG. 10 shows a display example of the input terminal list screen.

The input terminals of the registered apparatus "BRAVIA JP 2013?" as the selected output apparatus include four HDMI terminals "HDMI1," "HDMI2/MHL," "HDMI3," "HDMI4," and terminals for component signals "Components." The input terminal list screen of FIG. 10 shows the list of the input terminals (and inputs) of the registered apparatus "BRAVIA JP 2013?" as the selected output apparatus.

When the user selects any of the input terminals via the input terminal list screen (FIG. 10), the any of the input terminals is specified as a selected input terminal. As described with reference to Step S22 of FIG. 6, connection relationship information indicating that the selected providing apparatus and the any of the input terminals (of the selected output apparatus) are connected to each other is registered with the apparatus related information storage unit 66. Then, as described with reference to Step S23 of FIG. 6, a connection information list screen showing that the selected providing apparatus and the any of the input terminals (of the selected output apparatus) are connected to each other is displayed on the touch panel 64.

Figure 11:
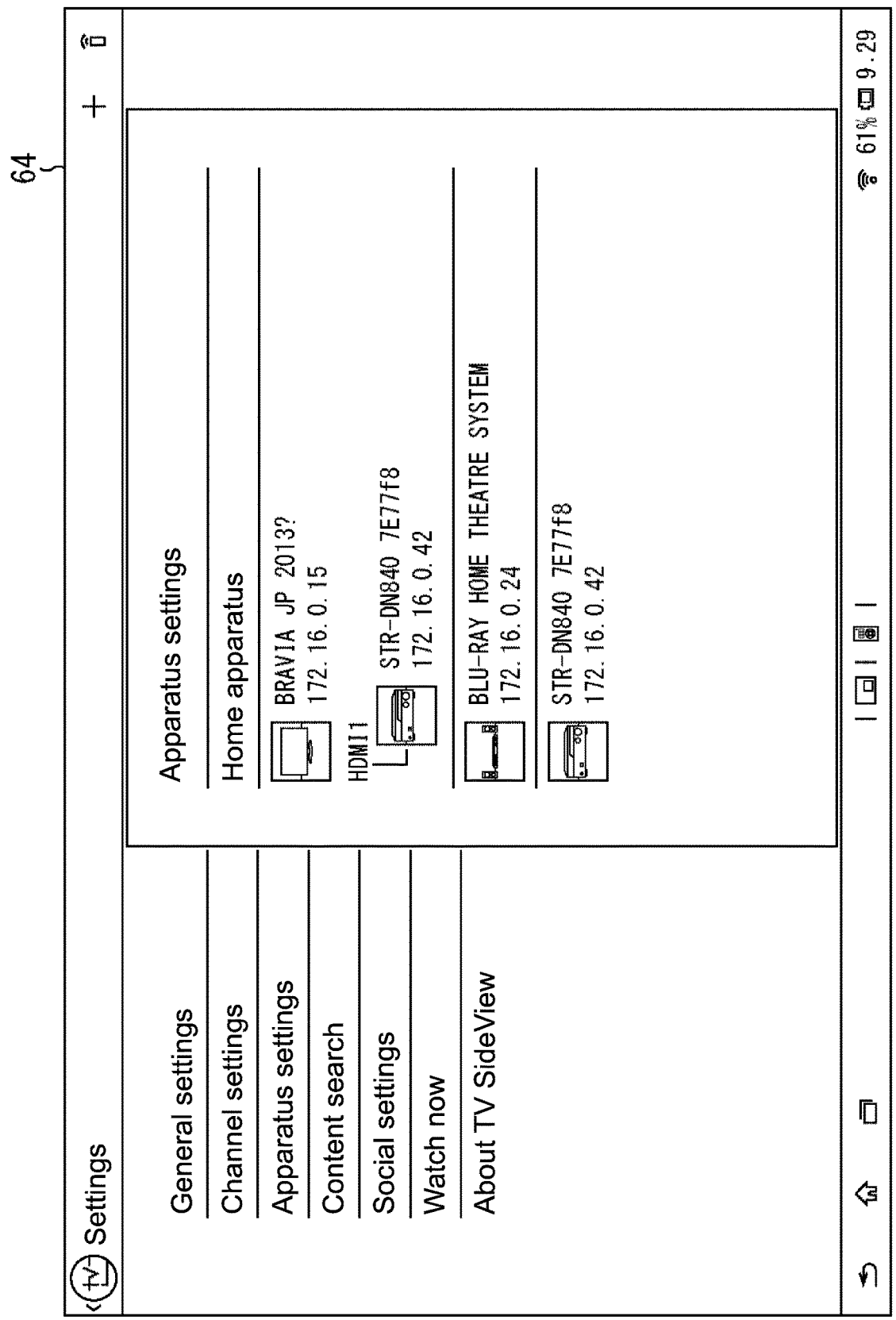
FIG. 11 shows a display example of a connection information list screen.

FIG. 11 shows a display example of the connection information list screen.

In this embodiment, the registered apparatus "STR-DN840 7E77f8" is selected as a selected providing apparatus via the connectable apparatus list screen of FIG. 9, and the HDMI terminal "HDMI1" of the registered apparatus "BRAVIA JP 2013?" as a selected output apparatus is selected as a selected input terminal via the input terminal list screen of FIG. 10. Thus, the connection information list screen of FIG. 11 shows that the input terminal "HDMI1" as the selected input terminal of the registered apparatus "BRAVIA JP 2013?" as the selected output apparatus, and the registered apparatus "STR-DN840 7E77f8" as the selected providing apparatus are connected to each other.

Note that "172.16.0.15" and the like in FIGS. 7 to 9 and FIG. 11 represent IP (Internet Protocol) addresses of the registered apparatus such as "BRAVIA JP 2013?" as the output apparatus 13 on the home network 10. Those addresses are contained, for example, in the apparatus information.

(Content Output Control Process)

Figure 12:
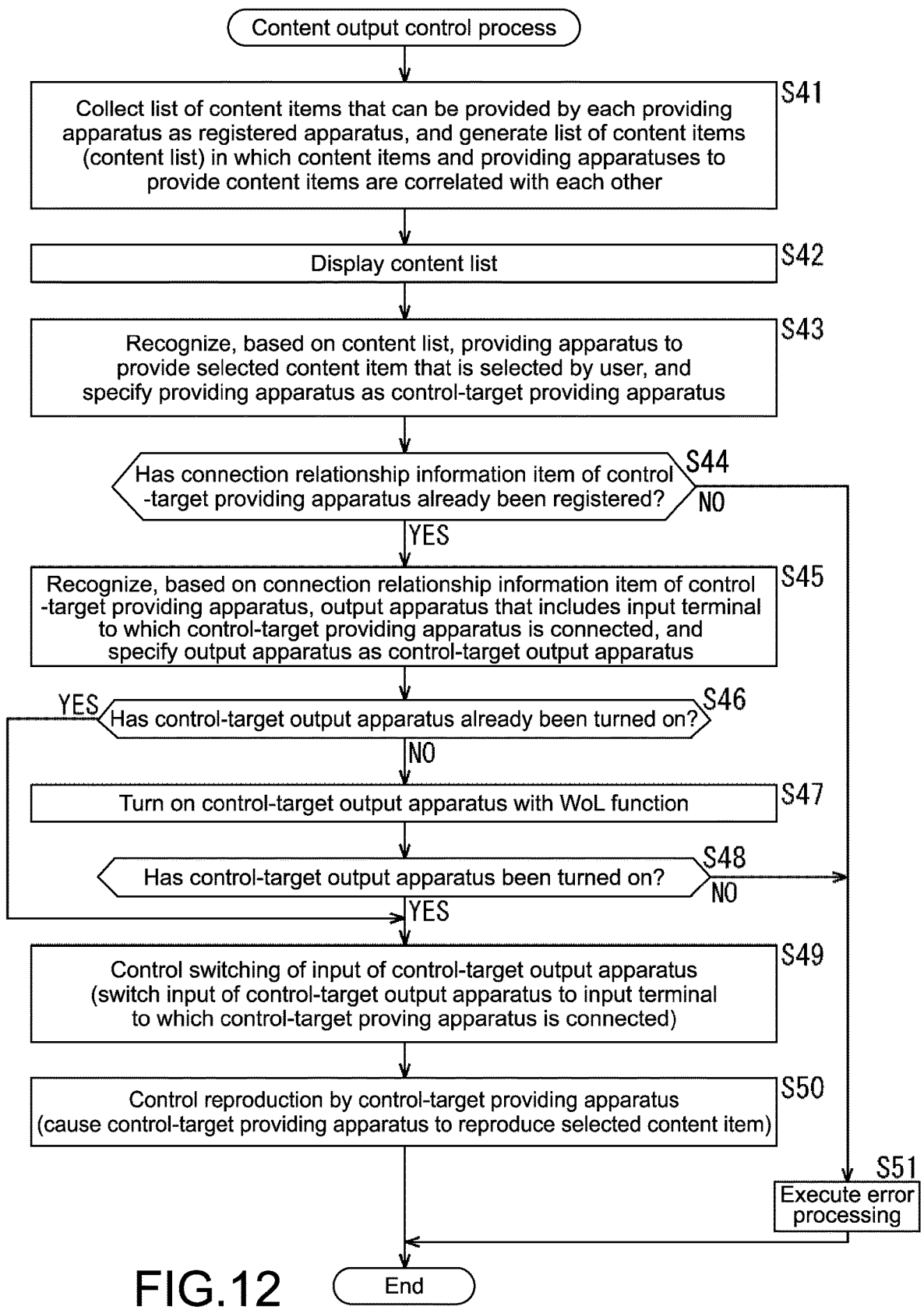
FIG. 12 is a flowchart showing a content output control process to be executed in the user terminal 14.

FIG. 12 is a flowchart showing the content output control process to be executed in the user terminal 14 of FIG. 5.

For example, when the user operates the user terminal 14 such that the content list is displayed, in Step S41, the control unit 62 of the user terminal 14 (FIG. 5) generates a content list of content items that can be provided by a providing apparatus as a registered apparatus on the home network 10, and stores the content list in the content list storage unit 67. Then, the flow proceeds to Step S42.

Specifically, based on the apparatus information stored in the apparatus related information storage unit 66, the control unit 62 collects, for example, from each of the providing apparatus $11_1$ and $11_2$ as registered apparatus via the home network 10 and the communication unit 61 (FIG. 5), a list of content items that can be provided thereby. Then, the control unit 62 generates a content list by integrating (mashup) the content lists from the providing apparatus $11_i$.

Note that the providing apparatus $11_i$ and content items to be provided thereby are registered in respective correlation with each other.

Further, the content items of the content list may be sorted based on the providing apparatus, specifically, for example, on content items that can be provided by the providing apparatus $11_1$ and content items that can be provided by the providing apparatus $11_2$. Alternatively, the content items of the content list may be sorted irrespective of the providing apparatus, specifically, in alphabetical order of the names of the content items.

In addition, the generation of the content list in Step S41 may be executed in advance at any timing other than the timing at which the user operates the user terminal 14 such that the content list is displayed. In Step S42, the control unit 62 causes the touch panel 64 to display the content list, which is stored in the content list storage unit 67. Then, the flow proceeds to Step S43.

In Step S43, the control unit 62 waits until the user taps to select any of the content items from the content list displayed on the touch panel 64. Then, based on the content list stored in the content list storage unit 67, the control unit 62 recognizes, from among the providing apparatus on the home network 10, a providing apparatus to provide a selected content item that is selected by the user.

Next, the control unit 62 specifies the providing apparatus to provide the selected content item as a control target, specifically, a control-target providing apparatus. Then, the flow proceeds from Step S43 to Step S44. In Step S44, based on the connection relationship information stored in the apparatus related information storage unit 66, the control unit 62 determines whether or not a connection relationship information item of the control-target providing apparatus has already been registered.

In Step S44, when the control unit 62 determines that the connection relationship information item of the control-target providing apparatus has not yet been registered, to which of the input terminals of which of the output apparatus the control-target providing apparatus has been connected cannot be recognized. Thus, the flow proceeds to Step S51, and the control unit 62 executes error processing such as display of a message indicating that the connection relationship information item of the control-target providing apparatus has not yet been registered on the touch panel 64. Then, the content output control process is completed.

Further, in Step S44, when the control unit 62 determines that the connection relationship information item of the control-target providing apparatus has already been registered, the flow proceeds to Step S45. Then, based on the connection relationship information item of the control-target providing apparatus, which is stored as a part of the connection relationship information in the apparatus related information storage unit 66, the control unit 62 recognizes, from among the output apparatus on the home network 10, an output apparatus that includes an input terminal to which the control-target providing apparatus is connected.

Then, the control unit 62 specifies the output apparatus including the input terminal to which the control-target proving apparatus is connected as the control target, specifically, as the control-target output apparatus. Then, the flow proceeds from Step S45 to Step S46.

In Step S46, via the communication unit 61 and the home network 10, the control unit 62 determines whether or not the control-target output apparatus has already been turned on.

Note that confirmation via the home network 10 as to whether or not the control-target output apparatus has been turned on can be performed by using, for example, an SSDP (Simple Service Discovery Protocol).

In Step S46, when the control unit 62 determines that the control-target output apparatus has not yet been turned on, the flow proceeds to Step S47. Then, via the communication unit 61 and the home network 10, the control unit 62 performs control of turning on the control-target output apparatus with the WoL function. Next, the flow proceeds to Step S48.

In Step S48, the control unit 62 determines whether or not the control-target output apparatus has been turned on.

In Step S48, when the control unit 62 determines that the control-target output apparatus has not yet been turned on, in other words, the control-target output apparatus has failed to be turned on with the WoL function, the control-target output apparatus that has been turned off cannot execute processes such as display of an image of a content item to be reproduced by the control-target providing apparatus. Thus, the flow proceeds to Step S51, and the control unit 62 executes the error processing, specifically, causes the touch panel 64 to display of a message indicating that the control-target output apparatus has been turned off. Then, the content output control process is completed.

Further, in Step S48, when the control unit 62 determines that the control-target output apparatus has been turned on, the flow proceeds to Step S49. Meanwhile, in Step S46, when the control unit 62 determines that the control-target output apparatus has already been turned on, the flow proceeds to Step S49. Then, based on the connection relationship information item of the control-target providing apparatus, which is stored in the apparatus related information storage unit 66, the control unit 62 controls the control-target output apparatus via the communication unit 61 and the home network 10 so as to switch an input of the control-target providing apparatus to the input terminal to which the control-target proving apparatus is connected. Then, the flow proceeds to Step S50.

In Step S50, the control unit 62 controls the control-target providing apparatus via the communication unit 61 and the home network 10 so as to cause the control-target providing apparatus to reproduce the selected content item that is selected from the content list by the user. Then, the content output control process is completed. The content item to be reproduced by the control-target providing apparatus is supplied to the control-target output apparatus. The input of the control-target output apparatus has been switched to the input terminal to which the control-target proving apparatus is connected. Thus, processes such as display of an image of a content item to be supplied from the control-target providing apparatus are executed.

In this embodiment, as shown in FIG. 3, the providing apparatus $11_1$ and $11_2$ are connected respectively to the input terminals $31_K$ and $31_L$ of the output apparatus 13. Thus, when the providing apparatus $11_1$ or $11_2$ is selected as the control-target proving apparatus, the output apparatus 13 is selected as the control-target output apparatus. Further, when the providing apparatus $11_1$ is selected as the control-target proving apparatus, an input of the output apparatus 13 as the control-target output apparatus is switched to the input terminal $31_K$ to which the providing apparatus $11_1$ as the control-target proving apparatus is connected.

Then, content to be reproduced by the providing apparatus $11_1$ as the control-target proving apparatus is supplied to the input terminal $31_K$ via the cable $12_1$, and the output apparatus 13 as the control-target output apparatus executes processes such as display of an image of the content to be supplied from the providing apparatus $11_1$ to the input terminal $31_K$.

Further, when the providing apparatus $11_2$ is selected as the control-target proving apparatus, the input of the output apparatus 13 as the control-target output apparatus is switched to the input terminal $31_L$ to which the providing apparatus $11_2$ as the control-target proving apparatus is connected. Then, content to be reproduced by the providing apparatus $11_2$ as the control-target proving apparatus is supplied to the input terminal $31_L$ via the cable $12_2$, and the output apparatus 13 as the control-target output apparatus executes processes such as display of an image of the content to be supplied from the providing apparatus $11_2$ to the input terminal $31_L$.

(Display Example of Touch Panel 64 at Time of Content Output Control Process)

FIG. 13 shows a display example of the touch panel 64 at the time of the content output control process. Specifically, FIG. 13 shows a display example of a screen of the content list displayed on the touch panel 64 in Step S42 in FIG. 12 (hereinafter, also referred to as content list screen).

On the content list screen, icons of the content items that are collected from and can be provided by all the providing apparatus $11_1$ and $11_2$ connected to the home network 10 are displayed, for example, in alphabetical order. Note that examples of the content include AV data items of programs and the like, and applications such as a browser.

As described above, in the user terminal 14, the content list and the connection relationship information are generated. Based on the content list and the connection relationship information, the providing apparatus $11_i$ to provide the selected content item that is selected from among content items in the content list by the user, and the output apparatus 13 including the input terminal $31_n$ to which the providing apparatus $11_i$ is connected are specified as the control targets. In this way, the providing apparatus $11_i$ and the output apparatus 13 as the control targets are controlled via the home network 10.

With this, usability of the user terminal 14 can be enhanced. Specifically, the user can select a desired content item from the content list without regard to in which of the providing apparatus $11_i$ on the home network 10 the desired content item is contained.

Further, only by selection of the desired content item by the user, the desired content item starts to be reproduced in the providing apparatus $11_i$ to reproduce the desired content item, and is supplied to the output apparatus 13 to which the providing apparatus $11_i$ is connected. Still further, in the case where the output apparatus 13 has been turned off, the output apparatus 13 is turned on. Then, the input of the output apparatus 13 is switched to the input terminal $31_n$ to which the providing apparatus $11_i$ to reproduce the desired content item is connected. With this, in the output apparatus 13, processes such as display of an image of the desired content item from the providing apparatus $11_i$ are executed.

In this way, only by selection of the desired content item without regard to which of the providing apparatus $11_i$ reproduces the desired content item, the user can view the desired content item without performing an operation of switching the power on/off or input of the output apparatus 13. As a specific example, description is made of a case where a Blu-ray disc player is connected to a component input terminal #1 of a digital TV on a single home network, and the digital TV has been outputting a terrestrial broadcast program.

In this case, when the user selects, as a selected content item from the user terminal 14, for example, a content item of video-on-demand service that can be reproduced by a Blu-ray disc player, a request for reproduction of the selected content item is issued from the user terminal 14 to the Blu-ray disc player via the home network. Simultaneously, a request for input switching to the component input terminal #1 is sent from the user terminal 14 to the digital TV via the home network.

With this, the selected content item is reproduced by the Blu-ray disc player. Further, in the digital TV, the input via which the terrestrial broadcast program is output is switched to the component input terminal #1. With this, the selected content item, which is supplied from the Blu-ray disc player connected to the component input terminal #1, is displayed.

As another example, description is made of a case where the Blu-ray disc player is connected to an HDMI input terminal #1 of the digital TV on the same home network, and the digital TV has been turned off.

In this case, when the user selects, as a selected content item, for example, a browser to be started up on the Blu-ray disc player, a request for start-up of an application of the browser is issued from the user terminal 14 to the Blu-ray disc player via the home network. Simultaneously, a WoL command for requesting power-on is sent from the user terminal 14 to the digital TV via the home network.

With this, the application of the browser is run on the Blu-ray disc player, and the digital TV is turned on. After the digital TV is turned on, a request for input switching to the HDMI input terminal #1 is sent from the user terminal 14 to the digital TV via the home network. With this, the input of the digital TV is switched to the HDMI input terminal #1, and an image (screen) of the browser run on the Blu-ray disc player connected to the HDMI input terminal #1 is displayed. With this, the user can operate the browser displayed on the digital TV from the user terminal 14.

Note that, for example, in a case where the apparatus configured to output content, such as a TV, and the apparatus configured to reproduce the content, such as a video player, are connected to each other with an HDMI cable, commands (control signals) can be exchanged between the TV and the video player connected to each other with the HDMI cable, specifically, exchanged via a single (1ch) control line called CEC (Consumer Electronics Control) of the HDMI cable.

Commands (control signals) common among vendors are defined as the commands to be exchanged under the CEC. However, the vendors may define unique commands so as to expand functions of products. In a case where such unique commands are defined as the commands to be exchanged under the CEC, the unique commands enable, for example, a TV that is connected to a video player with an HDMI cable to be turned on when a play button of the video player is pressed, and an input of the TV to be switched to an input terminal of the TV, to which the video player is connected.

However, in a case where the TV and the video player are connected to each other with a cable other than the HDMI cable, the unique commands to be exchanged under the CEC are disabled. Thus, even when the play button of the video player is operated, the TV cannot be turned on, or the input of the TV cannot be switched to the input terminal of the TV, to which the video player is connected.

In contrast, in the second screen system of FIG. 1, the providing apparatus $11_i$, the output apparatus 13, and the user terminal 14 are connected to the home network 10. Thus, not only in a case where the providing apparatus $11_i$ and the output apparatus 13 are connected to each other with the HDMI cable but also in a case where those apparatus are connected to each other with cables of any other types, from the user terminal 14 via the home network 10, the output apparatus 13 can be turned on, and the input of the output apparatus 13 is switched to the input terminal $31_n$ to which the providing apparatus $11_i$ to reproduce a selected content item that is selected by the user.

Note that, in this embodiment, the providing apparatus $11_i$ and the output apparatus 13 are connected to each other with the cable $12_i$ independent of the home network 10, and content to be provided by the providing apparatus $11_i$ is supplied to the output apparatus 13 via the cable $12_i$. However, technologies such as DLNA (Digital Living Network Alliance) may be utilized such that the content to be provided by the providing apparatus $11_i$ can be supplied to the output apparatus 13 via the home network 10.

Further, in this embodiment, description is made on an implicit premise that the providing apparatus $11_i$ includes one or more output terminals configured to output content to the outside, and the content to be provided by the providing apparatus $11_i$ is output from all the one or more output terminals. In this context, in the providing apparatus $11_i$, the output terminals configured to output the content may be switched (selected).

In the providing apparatus $11_i$, at the time of switching the output terminal configured to output the content an information item indicating to which of the output terminals of the providing apparatus $11_i$ the output apparatus 13 is connected may be contained in the connection relationship information. Further, based on the connection relationship information, control of switching which of the output terminals of providing apparatus $11_i$ outputs the content can be performed from the user terminal 14 via the home network 10.

Still further, in this embodiment, in a case where the output apparatus 13 has been turned off, control of turning on the output apparatus 13 is performed from the user terminal 14 via the home network 10. However, also in a case where the providing apparatus $11_i$ has been turned off as well as the output apparatus 13, control of turning on the providing apparatus $11_i$ can be performed from the user terminal 14 with the WoL function and the like via the home network 10.

Yet further, in this embodiment, as a method of selecting a content item from among content items in a content list, a method of selecting a content item from the content list displayed on the touch panel 64 is employed. However, the method of selecting a content item is not limited thereto. Note that, in this specification, processes to be executed in accordance with programs by computers (processors such as a CPU and a DSP) need not necessarily be executed in time series in the order described in the flowcharts. In other words, the processes to be executed in accordance with the programs by the computers also include processes to be executed in parallel or individually (such as parallel processes or processes in accordance with objects).

Further, the programs may be executed by a single computer (processor), or may be processed in a distributed manner by a plurality of computers. Alternatively, the programs may be transferred to a distant computer and executed thereby.

In addition, in this specification, the "system" refers to a collection of a plurality of components (such as apparatus and modules (parts)), and all the components need not necessarily be provided in the same casing. Thus, both a plurality of apparatuses that are connected to each other via a network while being contained respectively in their casings, and a single apparatus that has a single casing containing a plurality of modules are encompassed in the definition of the "system."

Note that the embodiment of the present technology is not limited to the embodiment described above and various modifications may be made thereto without departing from the gist of the present technology. For example, the user terminal 14 may be configured as a part of cloud computing in which a single function is shared and cooperatively performed by a plurality of apparatuses via a network.

Further, Steps describe above with reference to the flowcharts may be executed by a single apparatus, or may be shared and executed by a plurality of apparatuses. Still further, in a case where a plurality of processes are contained in a single Step, the plurality of processes contained in the single Step also may be executed by a single apparatus, or may be shared and executed by a plurality of apparatuses.

Yet further, the advantages described in this specification are merely examples, and are not intended to limit the scope of the present technology. Thus, other advantages may be provided.

Note that the present technology may employ the following configurations.

(1) A control apparatus, including
a control unit configured to control, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network.

(2) The control apparatus according to Item (1), in which the control unit is configured to control
the providing apparatus as the control target to provide the selected content item, and
the output apparatus as the control target to switch an input to the input terminal to which the providing apparatus as the control target is connected.

(3) The control apparatus according to Item (2), in which the control unit is configured to control, in a case where the output apparatus as the control target is not turned on, the output apparatus as the control target to be turned on.

(4) The control apparatus according to Item (3), in which the network includes a LAN (Local Area Network), and
the control unit is configured to control the output apparatus as the control target to be turned on with a WoL (Wake on LAN) function.

(5) The control apparatus according to any one of Items (1) to (4), which is configured to generate a list of content items that can be provided by each of the providing apparatuses that are connected to the network and can be controlled by the control unit, as the content list.

(6) The control apparatus according to any one of Items (1) to (5), which is configured to generate, according to an operation by a user, the connection relationship information with respect to the providing apparatuses and the output apparatuses that are connected to the network and can be controlled by the control unit.

(7) The control apparatus according to Item (6), which is configured to
display, on a display unit, a list of input terminals of the output apparatus that is selected by the user, and
generate the connection relationship information indicating that the providing apparatus that is selected by the user is connected to an input terminal that is selected by the user from among the input terminals displayed on the display unit.

(8) A control method, including
controlling, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network.

(9) A program that causes a computer to function as a control unit configured to control, based on a content list as a list of content items to be provided by providing apparatuses that are connected to a network and capable of providing the content items and on connection relationship information indicating connection relationships between the providing apparatuses and input terminals of output apparatuses that are connected to the network and capable of outputting the content items, a providing apparatus to provide a selected content item that is selected from among the content items in the content list and an output apparatus including an input terminal to which the providing apparatus is connected, as control targets via the network.

It should be understood by those skilled in the art that various modifications, combinations, sub-combinations and alterations may occur depending on design requirements and other factors insofar as they are within the scope of the appended claims or the equivalents thereof.

What is claimed is:

1. A control apparatus, comprising:
a processor configured to:
generate first connection relationship information that indicates connection relationships between a plurality of providing apparatuses and a plurality of input terminals of each of a plurality of output apparatuses;
receive a plurality of content lists from the plurality of providing apparatuses,
wherein each of the plurality of content lists includes a plurality of content items,
wherein the plurality of output apparatuses is connected to a network, and
wherein the plurality of output apparatuses outputs the plurality of content items corresponding to each of the plurality of content lists;
generate an integrated content list based on integration of the plurality of content lists received from the plurality of providing apparatuses;
control a display screen to display the integrated content list, wherein the displayed integrated content list includes the plurality of content items of each of the plurality of content lists;
control the display screen to further display a first list of the plurality of output apparatuses;
receive a first user selection to select an output apparatus from the displayed first list of the plurality of output apparatuses;
control the display screen to further display a second list of the plurality of providing apparatuses;
receive a second user selection to select a providing apparatus from the displayed second list of the plurality of providing apparatuses;
control the display screen to further display a third list of the plurality of input terminals of the selected output apparatus;
receive a third user selection to select a first input terminal from the displayed third list of the plurality of input terminals of the selected output apparatus;
determine the selected providing apparatus has a connection with a second input terminal of the plurality of input terminals of the selected output apparatus, wherein the determination is based on the first connection relationship information and the third user selection of the first input terminal;
delete second connection relationship information from the first connection relationship information, wherein the second connection relationship information indicates the selected providing apparatus is connected to the second input terminal;
generate third connection relationship information corresponding to the selected providing apparatus, wherein the third connection relationship information indicates the selected providing apparatus is connected to the first input terminal of the plurality of input terminals of the selected output apparatus;
receive a fourth user selection to select a content item from the displayed integrated content list;
control the selected providing apparatus, as a first control target, to provide the selected content item, wherein the selected providing apparatus is controlled based on the fourth user selection of the content item from the displayed integrated content list;
control the selected output apparatus as a second control target based on the third connection relationship information; and
transmit a power-on request through the network to turn on the selected output apparatus to reproduce the selected content item, wherein the transmission of the power-on request is based on the fourth user selection of the content item.

2. The control apparatus according to claim 1, wherein the processor is further configured to control the second control target to switch an input to the first input terminal, and
the first control target is connected to the first input terminal.

3. The control apparatus according to claim 2, wherein the processor is further configured to turn on the second control target that is turned off.

4. The control apparatus according to claim 3, wherein the network includes a LAN (Local Area Network), and the processor is further configured to turn on the second control target with a Wake on LAN (WoL) function.

5. The control apparatus according to claim 1, wherein the processor is further configured to generate, based on a user input, the first connection relationship information associated with the plurality of providing apparatuses and the plurality of output apparatuses.

6. A control method, comprising:
in a control apparatus:
generating first connection relationship information that indicates connection relationships between a plurality of providing apparatuses and a plurality of input terminals of each of a plurality of output apparatuses;
receiving a plurality of content lists from the plurality of providing apparatuses,
wherein each of the plurality of content lists includes a plurality of content items,
wherein the plurality of output apparatuses is connected to a network, and
wherein the plurality of output apparatuses outputs the plurality of content items corresponding to each of the plurality of content lists;

generating an integrated content list based on integration of the plurality of content lists received from the plurality of providing apparatuses;
controlling a display screen to display the integrated content list, wherein the displayed integrated content list includes the plurality of content items of each of the plurality of content lists;
controlling the display screen to further display a first list of the plurality of output apparatuses;
receiving a first user selection to select an output apparatus from the displayed first list of the plurality of output apparatuses;
controlling the display screen to further display a second list of the plurality of providing apparatuses;
receiving a second user selection to select a providing apparatus from the displayed second list of the plurality of providing apparatuses;
controlling the display screen to further display a third list of the plurality of input terminals of the selected output apparatus;
receiving a third user selection to select a first input terminal from the displayed third list of the plurality of input terminals of the selected output apparatus;
determining the selected providing apparatus has a connection with a second input terminal of the plurality of input terminals of the selected output apparatus, wherein the determination is based on the first connection relationship information and the third user selection of the first input terminal;
deleting second connection relationship information from the first connection relationship information, wherein the second connection relationship information indicates the selected providing apparatus is connected to the second input terminal;
generating third connection relationship information corresponding to the selected providing apparatus, wherein the third connection relationship information indicates the selected providing apparatus is connected to the first input terminal of the plurality of input terminals of the selected output apparatus;
receiving a fourth user selection to select a content item from the displayed integrated content list;
controlling the selected providing apparatus, as a first control target, to provide the selected content item, wherein the selected providing apparatus is controlled based on the fourth user selection of the content item from the displayed integrated content list;
controlling the selected output apparatus as a second control target based on the third connection relationship information; and
transmitting a power-on request through the network to turn on the selected output apparatus to reproduce the selected content item, wherein the transmission of the power-on request is based on the fourth user selection of the content item.

7. A non-transitory computer-readable medium having stored thereon computer-executable instructions, which when executed by a computer, cause the computer to execute operations, the operations comprising:
generating first connection relationship information that indicates connection relationships between a plurality of providing apparatuses and a plurality of input terminals of each of a plurality of output apparatuses;
receiving a plurality of content lists from the plurality of providing apparatuses,
wherein each of the plurality of content lists includes a plurality of content items,
wherein the plurality of output apparatuses is connected to a network, and
wherein the plurality of output apparatuses outputs the plurality of content items corresponding to each of the plurality of content lists;
generating an integrated content list based on integration of the plurality of content lists received from the plurality of providing apparatuses;
controlling a display screen to display the integrated content list, wherein the displayed integrated content list includes the plurality of content items of each of the plurality of content lists;
controlling the display screen to further display a first list of the plurality of output apparatuses;
receiving a first user selection to select an output apparatus from the displayed first list of the plurality of output apparatuses;
controlling the display screen to further display a second list of the plurality of providing apparatuses;
receiving a second user selection to select a providing apparatus from the displayed second list of the plurality of providing apparatuses;
controlling the display screen to further display a third list of the plurality of input terminals of the selected output apparatus;
receiving a third user selection to select a first input terminal from the displayed third list of the plurality of input terminals of the selected output apparatus;
determining the selected providing apparatus has a connection with a second input terminal of the plurality of input terminals of the selected output apparatus, wherein the determination is based on the first connection relationship information and the third user selection of the first input terminal;
deleting second connection relationship information from the first connection relationship information, wherein the second connection relationship information indicates the selected providing apparatus is connected to the second input terminal;
generating third connection relationship information corresponding to the selected providing apparatus, wherein the third connection relationship information indicates the selected providing apparatus is connected to the first input terminal of the plurality of input terminals of the selected output apparatus;
receiving a fourth user selection to select a content item from the displayed integrated content list;
controlling the selected providing apparatus, as a first control target, to provide the selected content item, wherein the selected providing apparatus is controlled based on the fourth user selection of the content item from the displayed integrated content list;
controlling the selected output apparatus as a second control target based on the third connection relationship information; and
transmitting a power-on request through the network to turn on the selected output apparatus to reproduce the selected content item, wherein the transmission of the power-on request is based on the fourth user selection of the content item.

* * * * *